(12) United States Patent
Gupta et al.

(10) Patent No.: US 11,538,200 B1
(45) Date of Patent: Dec. 27, 2022

(54) LOCATION-BASED REMINDERS OF LOCATION-SPECIFIC ITEMS

(71) Applicant: Apple Inc., Cupertino, CA (US)

(72) Inventors: Pushkar Gupta, Santa Clara, CA (US); Sakshyam Dahal, Sunnyvale, CA (US); Hrushikesh N. Kulkarni, Sunnyvale, CA (US); Chetna S. Gote, Fremont, CA (US)

(73) Assignee: Apple Inc., Cupertino, CA (US)

( * ) Notice: Subject to any disclaimer, the term of this patent is extended or adjusted under 35 U.S.C. 154(b) by 60 days.

(21) Appl. No.: 17/024,793

(22) Filed: Sep. 18, 2020

Related U.S. Application Data

(60) Provisional application No. 62/903,278, filed on Sep. 20, 2019.

(51) Int. Cl.
| | | |
|---|---|---|
| *G06T 11/00* | (2006.01) | |
| *G06T 7/70* | (2017.01) | |
| *G06Q 10/10* | (2012.01) | |
| *G01S 19/01* | (2010.01) | |
| G08B 21/24 | (2006.01) | |

(52) U.S. Cl.
CPC ............. *G06T 11/00* (2013.01); *G01S 19/01* (2013.01); *G06Q 10/1097* (2013.01); *G06T 7/70* (2017.01); *G08B 21/24* (2013.01)

(58) Field of Classification Search
None
See application file for complete search history.

(56) References Cited

U.S. PATENT DOCUMENTS

| | | | |
|---|---|---|---|
| 7,848,765 B2 | 12/2010 | Phillips et al. | |
| 8,606,645 B1 | 12/2013 | Applefeld | |
| 9,338,622 B2 | 5/2016 | Bjontegard | |
| 10,185,986 B2 | 1/2019 | Levesque et al. | |
| 2013/0027429 A1* | 1/2013 | Hogg | G06T 19/006 345/633 |
| 2013/0293530 A1 | 11/2013 | Perez et al. | |
| 2014/0258055 A1* | 9/2014 | Wolfe | G06Q 20/321 705/30 |
| 2015/0057029 A1* | 2/2015 | Gehrke | H04L 67/18 455/456.3 |
| 2021/0248798 A1* | 8/2021 | Chang | G06F 3/014 |

* cited by examiner

*Primary Examiner* — Yi Wang
(74) *Attorney, Agent, or Firm* — Thompson Hine LLP

(57) ABSTRACT

Various implementations disclosed herein include devices, systems, and methods that enable improved display of virtual content in computer generated reality (CGR) environments. In some implementations, the virtual content includes a reminder associated with a user and the user's physical environment.

20 Claims, 5 Drawing Sheets

LOCATION-BASED REMINDERS OF LOCATION-SPECIFIC ITEMS

CROSS-REFERENCE TO RELATED APPLICATIONS

This application claims the benefit of U.S. Provisional Application Ser. No. 62/903,278 filed Sep. 20, 2019, which is incorporated herein in its entirety.

TECHNICAL FIELD

The present disclosure generally relates to electronic devices, and in particular, to systems, methods, and devices that provide reminders in computer generated reality (CGR) environments.

BACKGROUND

Devices that provide computer generated reality (CGR) environments may be carried or worn by users while performing daily, and/or recurring, tasks. For example, a user of a device may wear a head-mounted device (HMD) as the user goes about his or her day. The viewed virtual content may be useful, for example, providing information about locations or objects in the user's physical environment.

SUMMARY

Various implementations disclosed herein include devices, systems, and methods for providing computer generated reality (CGR) content that includes additional content based on location-based reminders. In various implementations, a user is presented with a CGR environment depicting a physical environment based on an image captured by the HMD at a particular location and additional content based on a reminder associated with that particular location.

In some implementations, the reminder is associated with a user (e.g., a person, device, account, etc.) and a location-based trigger (e.g., an address, a location name/type, a retail store brand name, etc.). For example, the reminder may notify a user of a task, an item to obtain/deliver/return, or a past experience. In some implementations, the reminder is created manually. In some other implementations, the reminder is automatically created or learned based on user history, preferences, or content type. For example, a reminder may be automatically created based on a coupon and a retail location. Moreover, the location-based trigger may be associated with a single specific location or multiple locations, e.g., a particular retailer's coupon may be associated with any/all of the particular retailer's locations.

In some implementations, a location of a physical environment of an electronic device (e.g., at or around) is determined. For example, the device may identify locations around the user based on GPS or communication with a beacon, cell tower, or nearby device. In some implementations, the device uses image data to identify locations of physical buildings and objects near the user. For example, the device may use image data to identify a building fifty feet northwest in the image data is a particular retailer based on computer vision (e.g., recognizing the particular retailer's logo). In another example, the device may identify that the building is a particular retailer based on determining the device location and orientation of the device and estimating the locations of buildings/objects within view of the device based on that location and orientation and depth/distance determinations. For example, the device may determine its own coordinates (e.g. latitude and longitude, etc.) and then determine the coordinates (e.g., latitude and longitude) of a building that is in an image captured by the device that it determines is fifty feet northwest of the device. The identity of the building (e.g., its business name, function, etc.) can then be looked up based on the building's coordinates.

In some implementations, the reminder is based on a comparison of the location-based trigger and the location of the physical environment of the electronic device. For example, the device may match the location the location-based trigger and the location of the physical environment based on proximity or threshold distance. Moreover, other criteria (e.g., expiration date, time criteria, user preferences, etc.) may be used to identify the reminder.

In some implementations, a CGR environment depicting the physical environment based on the image and additional content based on the reminder is provided at the electronic device. For example, a virtual balloon with the phrase "Reminder: Retailer coupon expiring today" may be displayed next to the retailer's store. In some implementations, the CGR environment includes a route identifying multiple reminders (e.g., where the multiple reminders are associated with multiple location-based triggers).

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
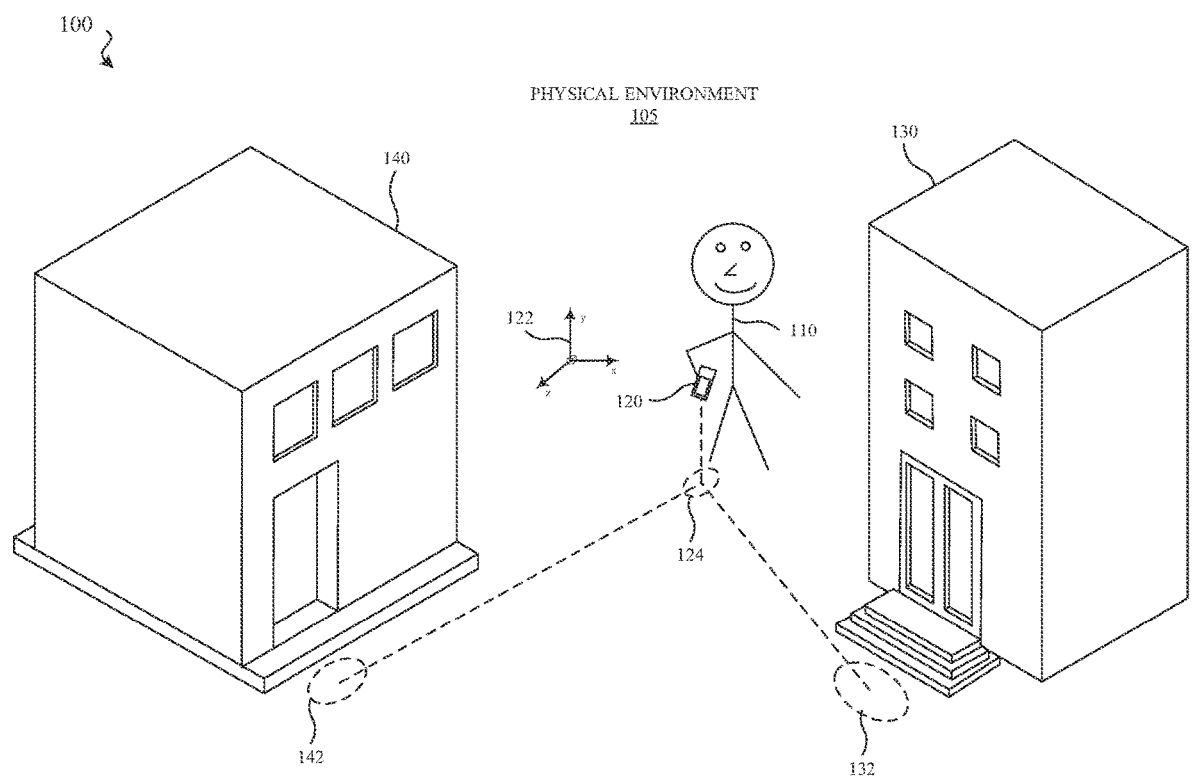
FIG. 1 illustrates a physical environment including a user and a device in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Referring to FIG. 1, an example operating environment 100 is illustrated in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a device 120 (e.g., a smartphone or an HMD) at a device location 124. The device 120 may include an integrated controller or may be in communication with a separate controller, one or both of which may be in a physical environment 105. A physical environment refers to a physical world that people can sense and/or interact with without aid of electronic systems. Physical environments, such as a physical park, include physical articles, such as physical trees, physical buildings (e.g., building 130 or building 140), physical locations (e.g., device location 124, location 132 of building 130, and location 142 of building 140) and physical people (e.g., user 110). People can directly sense and/or interact with the physical environment 105, such as through sight, touch, hearing, taste, and smell.

In some implementations, the device 120 is configured to manage, coordinate, and, present a CGR environment to the user 110. In some implementations, the device 120 includes a suitable combination of software, firmware, or hardware. The device 120 is described in greater detail below with respect to FIG. 4. In some implementations, a controller of the device 120 is a computing device that is local or remote relative to the physical environment 105. In some implementations, the functionalities of the controller of the device 120 are provided by or combined with the device 120, for example, in the case of an HMD that functions as a stand-alone unit.

In one example, a controller of the device 120 is a local server located within the physical environment 105. In another example, the controller of the device 120 is a remote server located outside of the physical environment 105 (e.g., a cloud server, central server, etc.). In some implementations, the controller of the device 120 is communicatively coupled with the device 120 via one or more wired or wireless communication channels (e.g., BLUETOOTH, IEEE 802.11x, IEEE 802.16x, IEEE 802.3x, etc.).

According to some implementations, the device 120 presents a CGR environment to the user 110 while the user 110 is present within the physical environment 105. A CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

One common problem users have with redeeming coupons is that they forget to use the coupon, and so never redeem the offered deal or the coupon eventually expires. To alleviate this problem, implementations provide a CGR environment depicting the physical environment 105 as well as additional content based on a reminder. For example, the device 120 may display reminders in certain desirable instances or locations until the coupon is redeemed. In some implementations, instances which may trigger a reminder being displayed to the user include the user being in close proximity to a location at which a coupon can be redeemed. Additional criteria may include whether the user 110 is viewing or trying to purchase an item for which the user 110 has a coupon, whether the coupon is nearing its expiration date, etc. Moreover, the device 120 may continually check for location-based triggers and may display a reminder when a location-based trigger has been triggered.

In some implementations, a reminder is associated with a user 110. For example, the user may be a person, a device, an account, etc. In some implementations, the reminder may be associated with a location-based trigger. For example, the reminder may notify the user 110 of a task, an item to obtain/deliver/return, a past experience, etc. In some implementations, the reminder is manually created by the user 110 (e.g., a task) and, in other implementations, the reminder is automatically created or learned based on user history (e.g., a past experience), preferences, or content type (e.g., an item or category of interest). For example, a coupon may be automatically associated with a trigger. In some implementations, a location-based trigger is associated with a single specific location (e.g., location 132 of building 130) and, in other implementations, a location-based trigger is associated with multiple locations (e.g., location 132 of building 130 and location 142 of building 140). For example, a particular retail coupon may be associated with any/all of that particular retailer's locations.

In some implementations, the device 120 determines one or more locations within the physical environment. For example, the device may determine a location 124 of the device 120, as well as a location 132 of building 130 or location 142 of building 140. In some implementations, the device 120 includes a global positioning system (GPS) engine that uses GPS data to identify the current location of the device 120 (e.g., location 124). In some implementations, the device 120 augments the GPS data with other terrestrial tracking data, such as triangulated cellular tower data, triangulated radio tower data, and correlations to known access points (e.g., cell-ID, Wi-Fi ID/network ID), in order to improve the accuracy of the identified location. Moreover, some implementations may use one or more of the types of terrestrial tracking data without GPS data. In some implementations, the device 120 tracks its own location over time based on tracking movement of the device 120 after a known location is determined for the device. In some implementations, the device 120 tracks its own location based on computer vision, e.g., identifying known objects in images captured by the device 120 and determining the devices relative location based on the locations of those objects.

In some implementations, a reminder specifies the level of precision required for the device location (e.g., high, medium, or low precision) and utilizes the required level of precision to optimize the power consumption. For example, in order to save power and processing resources, the device 120 may perform a low precision estimation of the device location. When the required precision level is low, the device 120 may use a WiFi location determination method that requires less power and has lower precision than GPS. In some implementations, the device 120 coalesces requests for device location from several applications on the device 120. For example, if higher precision GPS positioning is already performed for another application, the same location data may also be provided to other applications associated with location-based reminders. Otherwise, a low precision, low power consuming method (such as WiFi) may be used to determine the device location.

In some implementations, the device 120 identifies a reminder when the user 110 is in close proximity to a physical location associated with the reminder. For example, a user with a coupon which can be redeemed at a chain restaurant may be presented with additional CGR content reminding the user 110 of the coupon when the user 110 is near any of the chain restaurant locations. As another example, the user 110 may have a coupon associated with a business occupying building 130 and the device 120 may identify that the device location 124 is within close proximity of location 132 of building 130. Moreover, a user with a coupon for a particular item may be presented with a reminder notification when the user is in close proximity to any store which sells the particular item. The relative distance of the device to the location associated with the location-based reminder may be a set distance or a variable distance and, in some implementations, is adjustable by the user. For example, the proximity may be based on a field of view of the user or a camera in communication with the device 120.

In some implementations, a geo-fence (e.g., a virtual perimeter for a real-world geographic area) is used to identify location-based reminders. For example, a perimeter may be identified around a set location such as a building or store. In some implementations, the CGR experience is updated to include additional content based on the reminder upon determination that the device location 124 is within the set virtual perimeter around any location associated with the reminder. In some implementations, the location of businesses associated with reminders are determined by accessing a geo-location database and, in some implementations, the location associated with the reminders is stored with the reminder.

In some implementations, location-based reminders are shared between multiple devices. For example, a user of multiple devices may specify that reminders (e.g., based on coupons or retail locations) may be shared or accessed by each of the multiple devices. In some implementations, location-based reminders are shared between multiple users. For example, a user may belong to a friends and family group and may share location-based reminders with other users belonging to the same friends and family group.

In some implementations, the device identifies locations of physical buildings and objects near the user based on computer vision (e.g., recognizing a logo associated with the reminder). In some implementations, locations associated with the device or locations associated with the reminders are identified based on based on a structure-from-motion ("SfM") method, a simultaneous localization and mapping ("SLAM") method, a computer vision passive stereo method, a computer vision active stereo method comprising structured light, a photometric stereo method, a shape-from-shading method, a shape-from-defocus method, a geometric model-fitting method, a machine learning method, or a monocular depth estimation method. For illustrative purposes, FIG. 1 includes reference Cartesian axes 122 as a proxy geometry. As understood by one of ordinary skill in the art, implementations may employ any suitable viewpoint orientation, orientation references, and/or proxy geometry.

Figure 2:
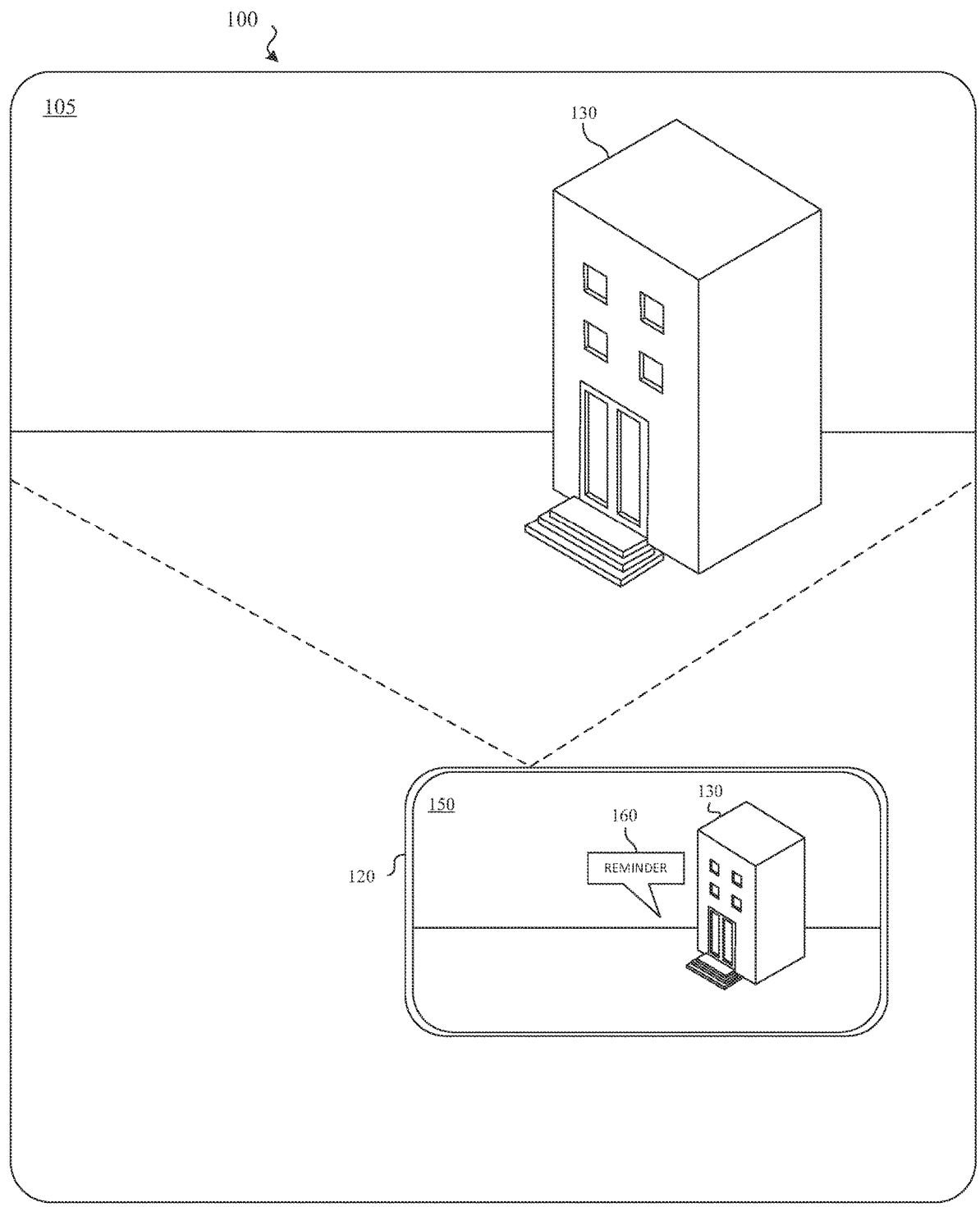
FIG. 2 illustrates a computer-generated reality (CGR) experience of a physical environment provided on a display of a device in accordance with some implementations.
Figure 3:
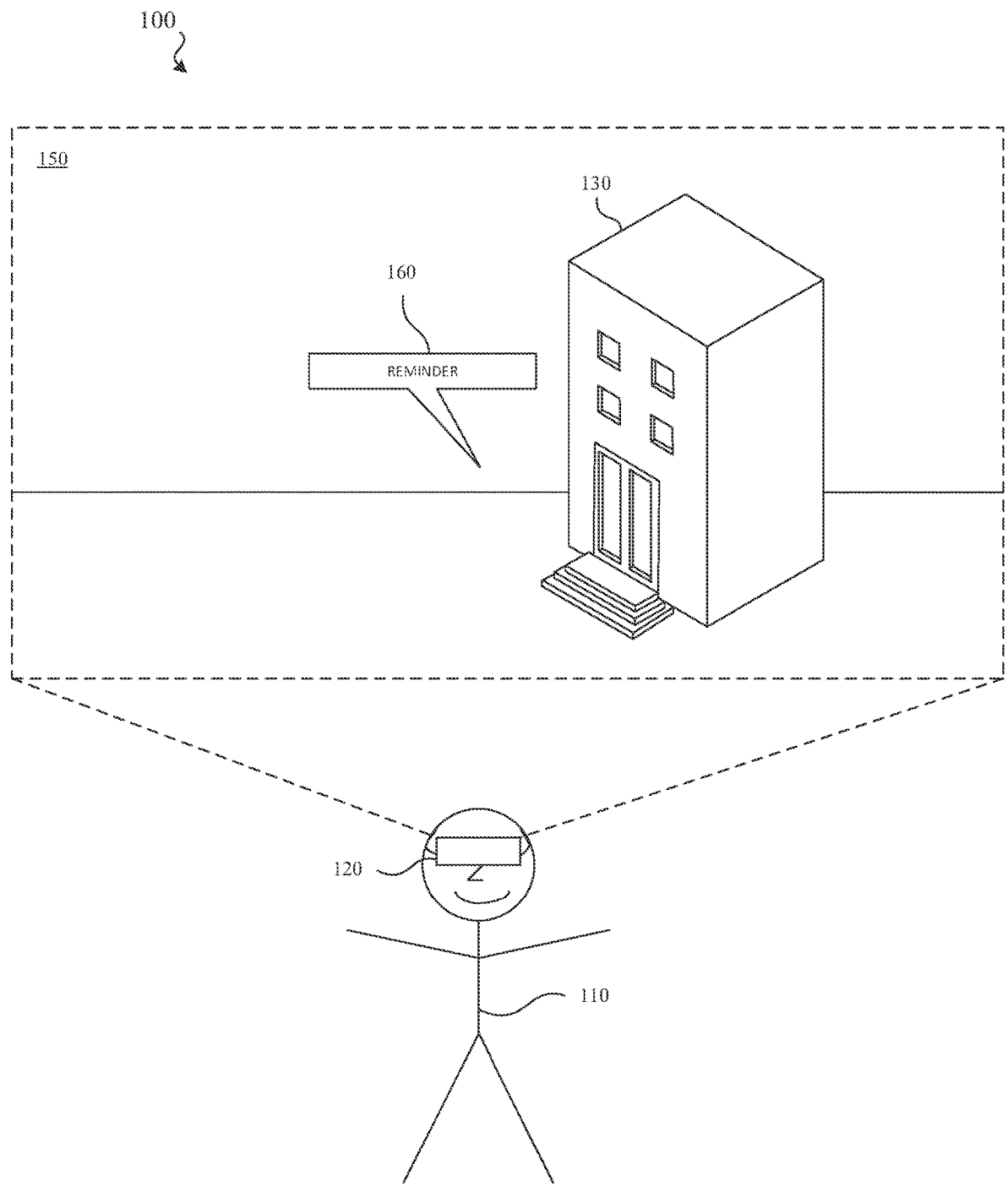
FIG. 3 illustrates a CGR experience of a physical environment provided on a display of a head mounted device (HMD) in accordance with some implementations.

As illustrated in FIG. 2, in accordance with some implementations the device 120 is a mobile electronics device and, as illustrated in FIG. 3, in accordance with some implementations the device 120 is an HMD configured to be worn on the head of a user 110. Such an HMD may enclose the field-of-view of the user 110. The device 120 can include one or more screens or other displays configured to display the CGR experience 150. In some implementations, the device 120 includes one or more screens or other displays to display the virtual element with real-world content that is in a field-of-view of the user 110. In some implementations, the device 120 is worn in a way that one or more screens are positioned to display the CGR experience 150 with real-world content of the physical environment 105 in a field-of-view of the user 110.

As illustrated in FIGS. 2 and 3 according to some implementations, device 120 presents the reminder 160 to the user 110 in the CGR experience 150. For example, the reminder 160 may include a virtual balloon with the phrase "Reminder: Coffee coupon expiring today" and may be displayed at the location of a coffee shop associated with reminder 160 (e.g., building 130). In some implementations, the reminder 160 includes details associated with a coupon (e.g., the business the coupon may be redeemed at and details of the offer). Moreover, the reminder 160 may also include buttons or other interactive features (e.g., allowing the user 110 to view the details of the reminder 160, dismiss the reminder 160 to be viewed at a later date, or initiate a transaction related to the reminder such as ordering coffee for pickup).

In some implementations, the device 120 is configured to store one or more reminders, or to communicate with one or more servers which store the reminder(s). For example, a reminder associated with a coupon, discount, or loyalty reward may be stored in a wallet, in an application, or may be part of an application, for collecting coupons, discounts, or loyalty rewards that are redeemable by the user 110. Moreover, the device 120 may be configured to provide reminders or alerts that are helpful in reminding the user 110 to redeem a coupon, discount, or loyalty reward. In some implementations, the CGR experience 150 includes multiple reminders (e.g., reminder 160) which may each be associated with one or more location-based triggers, as well as a route identifying the multiple reminders.

In some implementations, the device 120 validates reminders (e.g., reminders associated with coupons), and stores meta-data related to the reminder for access and/or download by the device 120. For example, meta-data may include information identifying a product or business for which a coupon can be redeemed, a coupon number or identifier such as a universal product code (UPC) associated with the coupon, specific information about the terms of the coupon such as the discount offered, the expiration date, or requirements for the offer to be redeemable, etc. In some implementations, the reminder is linked to specific payment methods (e.g., an online payment service, credit or checking account).

In addition to information identifying the reminder, the reminder can also include location-based information (e.g., location(s) of a business associated with the reminder or information about the type of business). For example, if the reminder is associated with a coupon for a free coffee at a common coffeehouse chain, the reminder may also be associated with the addresses of all locations of the coffeehouse chain participating in the coupon offer. Moreover, the coupon may include additional information about the business (e.g., hours of operation, etc.) or may be associated with a list of competitors and competing offers. In some implementations, the business or location information is downloaded from databases such as business directory services (e.g., yellow pages), and geographic information systems databases/geodatabases.

Figure 4:
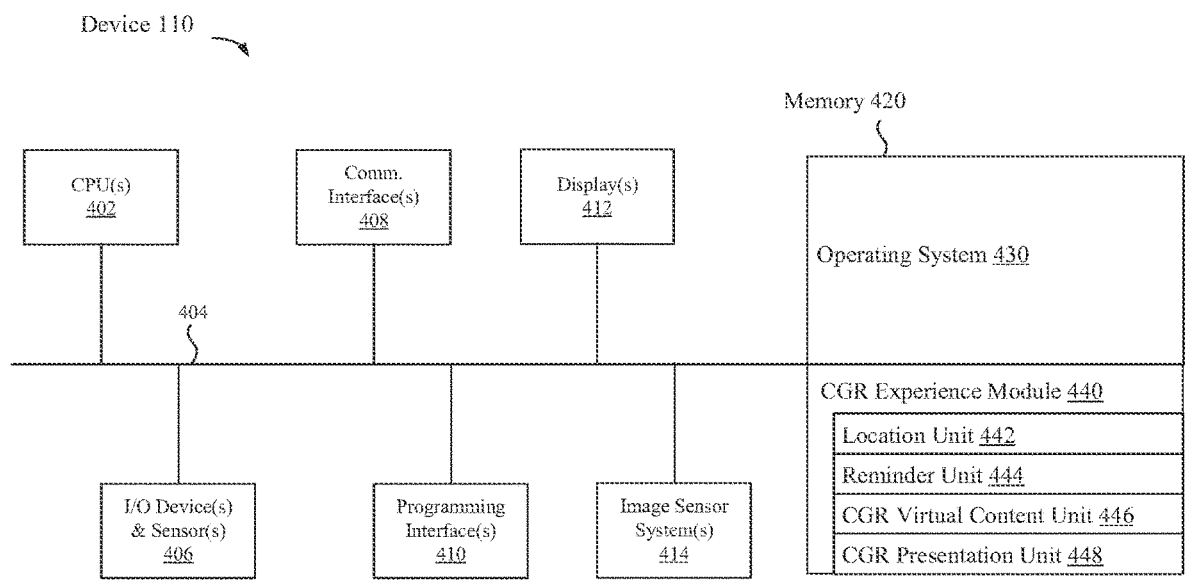
FIG. 4 is a block diagram of an example device in accordance with some implementations.

FIG. 4 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 402 (e.g., microprocessors, ASICs, FPGAs, GPUs, CPUs, processing cores, or the like), one or more input/output (I/O) devices and sensors 406, one or more communication interfaces 408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 410, one or more displays 412, one or more interior or exterior facing image sensor systems 414, a memory 420, and one or more communication buses 404 for interconnecting these and various other components.

In some implementations, the one or more communication buses 404 include circuitry that interconnects and controls communications between system components. In some implementations, the one or more I/O devices and sensors 406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 412 are configured to present a CGR environment to the user. In some implementations, the one or more displays 412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro—mechanical system (MEMS), or the like display types. In some implementations, the one or more displays 412 correspond to diffractive, reflective, polarized, holographic, etc. waveguide displays. For example, the device 120 includes a single display. In another example, the device 120 includes a display for each eye of the user.

The memory 420 includes high-speed random-access memory, such as DRAM, CGRAM, DDR RAM, or other random-access solid-state memory devices. In some implementations, the memory 420 includes non-volatile memory, such as one or more magnetic disk storage devices, optical disk storage devices, flash memory devices, or other non-volatile solid-state storage devices. The memory 420 optionally includes one or more storage devices remotely located from the one or more processing units 402. The memory 420 comprises a non-transitory computer readable storage medium. In some implementations, the memory 420 or the non-transitory computer readable storage medium of the memory 420 stores the following programs, modules and data structures, or a subset thereof including an optional operating system 430 and a CGR module 440.

The operating system 430 includes procedures for handling various basic system services and for performing hardware dependent tasks.

In some implementations, the CGR module 440 is configured to create, edit, present, or experience CGR environments. In some implementations, the CGR module 440 includes a location unit 442, a reminder unit 444, a CGR virtual content unit 446, and a CGR presentation unit 448.

In some implementations, the location unit 442 is configured to determine a location of the device 120. For example, the location unit 442 may determine a location of the device 120 by utilizing GPS, SLAM, inertial data, a depth sensor, or computer vision to detect objects having known locations and determining the device's pose based on the relative position of those known objects. In some implementations, the location unit 442 is configured to determine the locations/identities of physical objects or buildings. For example, the location unit 442 may determine the locations/identities of physical objects or buildings by utilizing GPS, SLAM, inertial data, a depth sensor, or computer vision to detect objects having known locations and determining the device's pose based on the relative position of those known objects.

In some implementations, the reminder unit 444 is configured to associate a reminder with a user (e.g., a person, device, account, etc.) and a location-based trigger (e.g., an address, a location name/type, a retail store brand name, etc.). For example, the reminder unit 444 may be configured to create reminders by utilizing manual input of a sur or to automatically create reminders based on user history, preferences, or content type. Moreover, the reminder unit 444 may associate a location-based trigger with a single specific location (e.g., a location of a single retailer) or multiple locations (e.g., the location of any retailer belonging to a retail chain).

In some implementations, the CGR virtual content unit 446 is configured to determine a virtual content location to place virtual content based on the determined location of the device, the reminder, and the location-based trigger. For example, the CGR virtual content unit may match the location of the device to the location-based trigger (based on proximity, threshold distance, etc.).

In some implementations, the CGR presentation unit 448 is configured to present virtual content (e.g., 3D content) that will be used as part of CGR environments for one or more users. For example, the user may view and otherwise experience a CGR-based user interface that allows the user to select, place, move, and otherwise present a CGR environment, for example, based on the virtual content location via hand gestures, voice commands, input device inputs, etc. Although these modules and units are shown as residing on a single device (e.g., the device 120), it should be understood that in other implementations, any combination of these modules and units may be located in separate computing devices.

Moreover, FIG. 4 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 5:
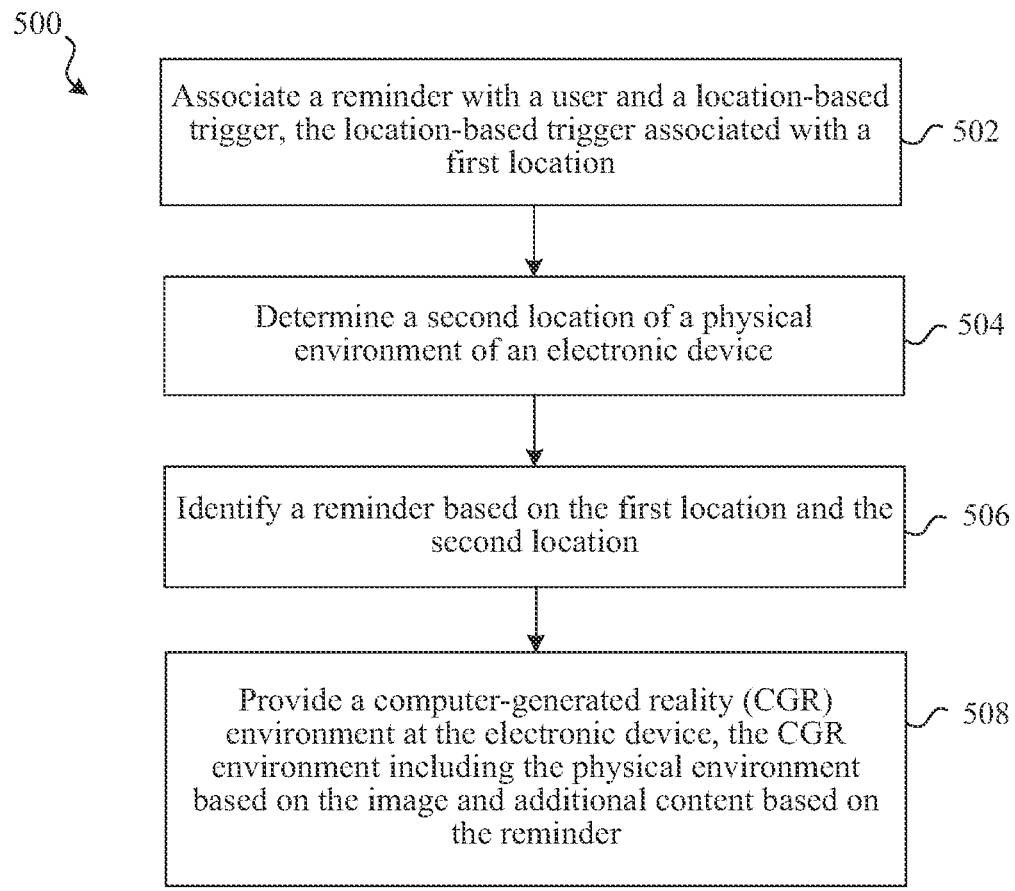
FIG. 5 is a flowchart illustrating an exemplary method of providing a view of a CGR environment, according to some implementations.

FIG. 5 is a flowchart illustrating an exemplary method of providing a view of a CGR environment, according to some implementations. In some implementations, the method 500 is performed by a device (e.g., device 120 of FIGS. 1-4). The method 500 may be performed at a mobile device, HMD, desktop, laptop, server device, or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory).

At block 502, the method 500 associates a reminder with a user and a location-based trigger, the location-based trigger being associated with a first location. In one example, the reminder is created based on a user input or selection and, in another example, the reminder is automatically created by the device. In some implementations, the method 500 associates the location-based trigger with the first location based on a property of the reminder. In one example, the reminder includes an address, a location name or type, or a retail store brand name.

At block 504, the method 500 determines a second location of a physical environment of an electronic device. In one example, the location of the physical environment of the electronic device is identified based on GPS or communication with a beacon, cell tower, or nearby device. In another example, locations of physical buildings and objects near the electronic device are identified based on computer vision or by determining the device location and orientation and estimating the locations of buildings or objects within view of the device based on that location and orientation and depth/distance determinations.

At block 506, the method 500 identifies the reminder based on the first location and the second location. In one example, the method 500 matches the first location and the second location based on proximity, threshold distance, etc. In another example, the method 500 identifies the reminder based at least in part on other criteria, such as an associated expiration date, time criteria, or user preferences.

At block 508, the method 500 provides a CGR environment at the electronic device, where the CGR environment depicts the physical environment based on the image and additional content based on the reminder. In one example, the method 500 depicts the reminder in the form of a virtual balloon that includes graphics or text associated with the reminder.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a processor of an electronic device having one or more sensors:
   associating a reminder with a user and a location-based trigger, wherein a first location is associated with the location-based trigger;
   capturing image data of the electronic device in a physical environment via an image sensor of the one or more sensors;
   determining a second location of an object based on the image data by:
   identifying the object depicted in the image data;
   determining a location and an orientation of the electronic device;
   determining a relative positioning of the object with respect to the electronic device based on depth data derived from sensor data from the one or more sensors; and
   determining the second location of the object based on the location of the electronic device and the relative positioning of the object with respect to the electronic device;
   identifying the reminder based on the first location associated with the location-based trigger and the second location of the object; and
   providing a computer-generated reality (CGR) environment at the electronic device, the CGR environment depicting the physical environment based on an image of the physical environment and additional content based on the reminder.

2. The method of claim 1 further comprising:
   associating a plurality of reminders with a plurality of location-based triggers, each of the plurality of location-based triggers being associated with one of a plurality of locations; and
   identifying a route based on the plurality of locations, wherein the CGR environment includes the route.

3. The method of claim 1, wherein the location-based trigger is associated with an address, a location name, a location type, or a brand name.

4. The method of claim 1, wherein the reminder includes a task, an item of interest, or a memory associated with a past experience of the user.

5. The method of claim 1, wherein the reminder includes a discount, coupon, or loyalty reward.

6. The method of claim 1, wherein the reminder is generated based on user input.

7. The method of claim 1, wherein the reminder is automatically generated based on user history, preferences, or a content type associated with the location-based trigger.

8. The method of claim 1, wherein the location-based trigger is associated with a plurality of locations.

9. The method of claim 1, wherein the second location is determined based on global positioning system (GPS) data corresponding to a device providing the CGR experience.

10. The method of claim 1, wherein the second location is determined based on a location of a beacon or a cell tower in communication with the device providing the CGR experience.

11. The method of claim 1, wherein identifying the object is based on computer vision.

12. The method of claim 1, wherein identifying the reminder comprises matching the first location and the second location based on a proximity or a threshold distance.

13. The method of claim 1, wherein the reminder is associated with an expiration date, a time criterion, or a user preference.

14. The method of claim 1, wherein determining the second location of the object based on the image data is based on determining a level of precision required for determining location information associated with the electronic device to optimize power consumption utilized by the electronic device.

15. A system comprising:
    an electronic device having one or more sensors, a processor, and a computer-readable storage medium comprising instructions that upon execution by the processor cause the system to perform operations, the operations comprising:
    associating a reminder with a user and a location-based trigger, wherein a first location is associated with the location-based trigger;
    capturing image data of the electronic device in a physical environment via an image sensor of the one or more sensors;
    determining a second location of an object based on the image data by:
    identifying the object depicted in the image data;
    determining a location and an orientation of the electronic device;
    determining a relative positioning of the object with respect to the electronic device based on depth data derived from sensor data from the one or more sensors; and
    determining the second location of the object based on the location of the electronic device and the relative positioning of the object with respect to the electronic device;
    identifying the reminder based on the first location associated with the location-based trigger and the second location of the object; and
    providing a computer-generated reality (CGR) environment at the electronic device, the CGR environment depicting the physical environment based on an image of the physical environment and additional content based on the reminder.

16. The system of claim 15, the operations further comprising:
    associating a plurality of reminders with a plurality of location-based triggers, each of the plurality of location-based triggers being associated with one of a plurality of locations; and identifying a route based on the plurality of locations, wherein the CGR environment includes the route.

17. The system of claim 15, wherein the location-based trigger is associated with an address, a location name, a location type, or a brand name.

18. The system of claim 15, wherein the reminder includes a task, an item of interest, or a memory associated with a past experience of the user.

19. The system of claim 15, wherein the reminder includes a discount, coupon, or loyalty reward.

20. A non-transitory computer-readable storage medium storing program instructions that are computer-executable to perform operations comprising:
   associating a reminder with a user and a location-based trigger, wherein a first location is associated with the location-based trigger;
   capturing image data of an electronic device in a physical environment via an image sensor of one or more sensors of the electronic device;
   determining a second location of an object based on the image data by:
      identifying the object depicted in the image data;
      determining a location and an orientation of the electronic device;
      determining a relative positioning of the object with respect to the electronic device based on depth data derived from sensor data from the one or more sensors; and
      determining the second location of the object based on the location of the electronic device and the relative positioning of the object with respect to the electronic device;
   identifying the reminder based on the first location associated with the location-based trigger and the second location of the object; and
   providing a computer-generated reality (CGR) environment at the electronic device, the CGR environment depicting the physical environment based on an image of the physical environment and additional content based on the reminder.

* * * * *